Apr. 3, 1923.

1,450,793

W. W. BUCHER

AUTOMATIC POWER UNIT CONTROL

Filed Mar. 20, 1919

William W. Bucher Inventor

By H. S. Armstutz Atty.

Patented Apr. 3, 1923.

1,450,793

UNITED STATES PATENT OFFICE.

WILLIAM W. BUCHER, OF CHICAGO, ILLINOIS, ASSIGNOR, BY MESNE ASSIGNMENTS, TO KOHLER COMPANY, OF KOHLER, WISCONSIN, A CORPORATION OF WISCONSIN.

AUTOMATIC POWER-UNIT CONTROL.

Application filed March 20, 1919. Serial No. 283,912.

*To all whom it may concern:*

Be it known that I, WILLIAM W. BUCHER, citizen of the United States, residing at Chicago, in the county of Cook and State of Illinois, have invented certain new and useful Improvements in Automatic Power-Unit Controls, of which the following is a specification.

My invention relates to improvements in automatic power unit controls, and it more especially consists of the features pointed out in the annexed claims.

The purpose of my invention is to provide a means of control for electric generating units that are driven by internal combustion engines so as to maintain uniform voltage under widely fluctuating load conditions; that provides automatic means for operating the usual choker and throttle, approximately simultaneously, through the use of an engine governor; that provides an engine control for direct connected high voltage generators when such generators are used as starting motors at relatively low voltages to prevent the generators remaining in the low voltage starting circuit after the engine comes to speed under its own power; and that provides means for selecting the moment when the engine control shall act to cause the generator to deliver current at its own normal voltage.

With these and other ends in view I illustrate in the accompanying drawing such instances of adaptation as will disclose the broad underlying principles without limiting myself to the specific details shown.

Figures 1, 2:
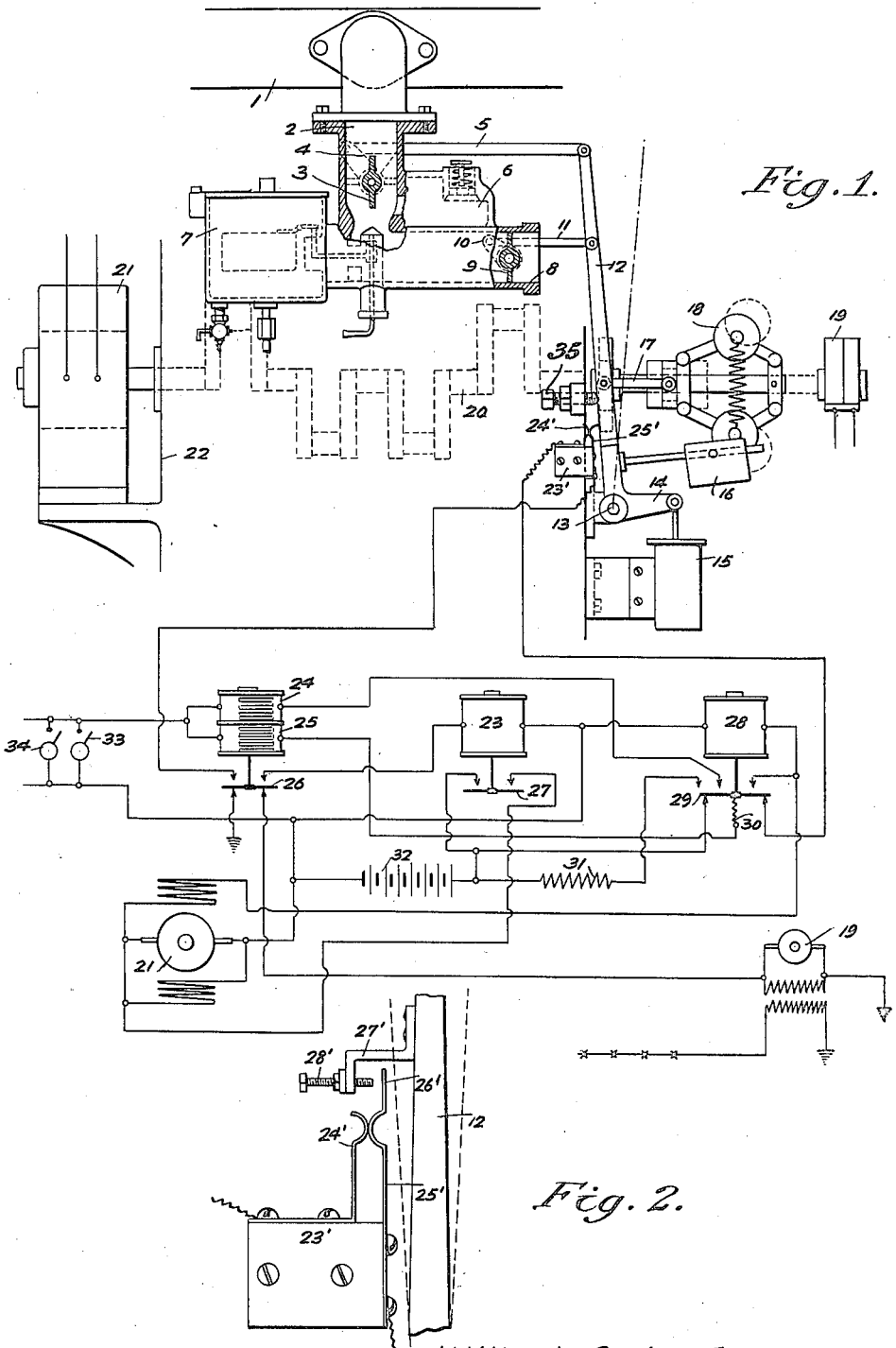
Fig. 1 is a diagrammatic elevation of a carburetor partly in section, with the engine governor controls, etc., in the stopping position, and in connection with these parts there is also shown the diagrammatic relation of the circuits comprising an isolated electric generating plant.
Fig. 2 is a detached elevation of an electric control actuated by the engine governor.

In the practical operation of isolated electric generating plants operated by internal combustion engines it is necessary to make provision for extremely close speed regulation so as to hold the voltage quite uniform. In addition, when such a system uses a generator that is also utilized as a motor for starting purposes at a voltage much lower than its normal rating, provision must be made to relieve the generator of this starting current influence at or near the moment the engine begins to rotate at its normal rate under its own power. If this is not done and the engine is allowed to go into its full speed while the generator is still under the low voltage starting conditions it will not subsequently pick up and deliver current at its normal E. M. F., with any degree of certainty or regularity, making plants unsatisfactory.

These conditions are automatically overcome in proper sequence by the engine governor so that the generator will not "lag" and the fuel intake and the usual air supply to the carbureter will be properly governed according to the fluctuations of the load the system is carrying.

The problem if speed regulation in plants of this type is much more difficult than for other power purposes, because the fluctuations in demand for current are very large, ranging from that required for a single lamp to the full capacity of the generator. If the regulation is not close annoying conditions will always be present and the practical value of an outfit be seriously impaired.

Certain proposals have been made to bring about ideal regulation through the automatic governing of the auxiliary air admitted to the carburetter and the extent to which the throttle is opened at about the same time, by the engine governor, leaving the ordinary air supply unaffected. In this instance, in connection with certain electrical controls the throttle and the ordinary air supply is regulated and the auxiliary air is not.

In practically carrying out my invention I employ the various elements instanced in the accompanying drawing, or their substantial equivalents, but in the specific relation of the various parts considerable variation may be made without departing from the spirit of my invention.

An engine 22 of any efficient type may be employed. To its crank shaft 20 a generator 21 is attached in any well known manner. A magneto 19 and a governor 18 are also actuated by the engine. The generator 21 is of standard or normal voltage rating—approximately, 110 to 115 volts. A starting battery 32 of about 24 volts, or even less, may be used to start the system whenever a single lamp 34 is turned on by switch 33. The low-voltage battery current flows over the service mains, the shunt windings of the generator and its armature, making a motor of it, temporarily, without including the series field.

The battery 32 is automatically recharged through a permanent resistance 31 under control of the "running" magnet 28 and its contact bar 29. The starting magnet 23 through its contact bar 27 controls the activity of the battery 32 and the generator 21 when the generator is used as a motor. It is set into action by the fine wire coil 25 and contact bar 26, which may be called the starting control magnet. The coarse wire coil 24 also acts on the bar 26 to keep the magneto 19 operative by withholding a grounding connection therefrom. It may be called the running control magnet. Current from the battery, in the first instance, flows through one or more lamps 34, fine wire coil 25, "pig tail" 30, bar 29 and back to the battery. This removes the ground from the magneto 19 and also energizes the starting magnet 23. These features are made the subject of a separate application so are not further described herein.

The special regulating means used comprises a governor controlled connection from the throttle and the choker forming a part of carbureter 7. The carbureter is attached to the passage 2 which is connected to the intake manifold 1 of the engine 22. The ordinary air inlet is found at 8 and the supplementary air inlet at 6. The choker valve 9 is placed in inlet 8. It is operated by an arm 10 attached to link 11. The throttle valve 3 is located in the passage 2. An arm 4 and link 5 operate the throttle valve 3.

The links 5 and 11 are attached to the governor arm 12 near its upper end. This arm is pivoted at 13 from which point a short arm 14 extends laterally and is attached to a plunger operative in the dash pot 15. A link 17 connects the arm 12 to the governor 18 in any well known manner and a counter weight 16 adjustable on a stem which projects from the arm 12 serves to balance the entire lever system. The dash pot 15 prevents "hunting". A stop screw 35 cooperates with the arm 12 to limit the rest position of the governor system.

To control some of the electrical features of a system of this kind, heretofore described, an insulating block 23' is suitably attached within the range of the governor arm movement. It has two contact springs 24' and 25' which are connected in the starting control circuit so as to disconnect it when the engine comes to speed and permit the dynamo to build up its normal voltage. The moment this disconnection takes place is determined by set screw 28' held in bracket 27' in an insulated or other manner. The screw 28' engages the projecting end 26' of spring 25' by means of which the proper moment when the two contacts 24' and 25' shall be disconnected, with respect to the speed of the engine, can be quickly determined, after which the screw is locked in place in any well known manner. The bracket 27' is attached to the governor arm 12 and moves with it as the governor responds to variations in speed of the engine.

The initial starting speed at which the engine is cranked is too low to start the governor arm into action, hence the throttle and the choker remain unaffected until the engine comes up to a predetermined speed when the throttle will be partly closed and the choker opened. If the power demand is further increased beyond the capacity of the opened choker 9 the supplementary air inlet 6 will function to let in more air as needed, independently of the choker inlet 8. Since the throttle and choker are actuated in co-ordinate relation, they are always in opposition to each other, that is, when the throttle is open the choker is closed and vice-versa. This exact interdependent relation may be varied if desired by simply forming a slot in either one of the links 5 or 11 where they are attached to the arm 12. In this way the time relation between the two functions can be varied at will. As the use of slots for similar purposes is a well known mechanical expedient it is not shown in detail.

What I claim is

1. In speed control devices, an internal combustion engine, a carbureter connected thereto, a throttle between the carbureter and the engine, a choker valve in the air supply of the carbureter, a self regulating supplementary air supply leading to the throttle independently of the choker controlled supply, a governor actuated by the engine, and connections between the governor, the throttle and the choker for simultaneous operation to control the starting of the engine.

2. In speed control devices, an internal combustion engine, a carbureter connected to the intake manifold of the engine, a throttle between the carbureter and the engine, an air intake to the carbureter, an automatic self-regulating supplementary air intake to the throttle, a choker valve in the first mentioned air intake, a throttle control, a choker control, an engine governor connected to both controls, and means for limiting the idle position of the interconnected actuating means.

3. In speed control devices, an internal combustion engine, a carbureter connected thereto, a throttle between the carbureter and the engine, an independent air inlet to the carbureter, a choker valve in such inlet, a supplemental self-regulating air inlet, a governor actuated by the engine, and means for simultaneously operating the choker and the throttle through the movement of the governor without affecting the independent air inlet.

4. In control devices for internal combustion engines, a carbureter connected to the engine, a throttle between the carbureter and the engine, a normal air supply for the carbureter, a control therein, a self regulating auxiliary air supply between the control and the throttle, means responsive to variations of engine speed, and cooperating means for directing the air control and throttle to thereby place them into a starting position and subsequently change them into a running position.

5. In control devices for internal combustion engines, a carbureter therefor, a liquid fuel supply for the carbureter, a normal air supply to volatilize the fuel, a throttle between the carbureter and the engine, a choker to control the normal air supply, a self-regulating supplementary air intake between the control and the throttle, means for controlling the throttle under changes of speed of the engine, and means for also actuating the choker under variations of engine speed whereby the starting and running of the engine is automatically controlled.

6. In internal combustion engine control devices, a carbureter, an automatically controlled air supply for the carbureter, an automatically controlled throttle, a self regulating supplementary air supply, a governor responsive to changes in engine speed, and means for conditioning the engine for starting comprising connections from the governor to the aforementioned automatic controls, and electrical starting means controlled by the governor.

7. In a control for electrically started, gas engine operated, generating systems, the combination with the engine, throttle, choker and starting control circuit of means dependent on the speed of the engine, and means operated thereby when the engine stops to condition the system for starting by opening the throttle, closing the choker and closing a break in the starting control circuit.

8. In a control for electrically started gas engine operated generating systems, the combination with the engine and its starting control circuit of a throttle, a choker and a starting control circuit switch, and means dependent on the speed of the engine for conditioning the engine for starting when it stops by opening the throttle, closing the choker and closing the starting control circuit switch.

In testimony whereof I affix my signature.

WILLIAM W. BUCHER.